(12) United States Patent
Muhr

(10) Patent No.: US 11,578,819 B2
(45) Date of Patent: Feb. 14, 2023

(54) WIRE HOLDER DEVICE

(71) Applicant: John Muhr, Littleton, CO (US)

(72) Inventor: John Muhr, Littleton, CO (US)

( * ) Notice: Subject to any disclaimer, the term of this patent is extended or adjusted under 35 U.S.C. 154(b) by 574 days.

(21) Appl. No.: 16/416,276

(22) Filed: May 20, 2019

(65) Prior Publication Data

US 2019/0338867 A1 Nov. 7, 2019

Related U.S. Application Data

(63) Continuation-in-part of application No. 16/403,171, filed on May 3, 2019, now abandoned.

(60) Provisional application No. 62/666,102, filed on May 3, 2018.

(51) Int. Cl.
| | | |
|---|---|---|
| *F16L 3/06* | (2006.01) | |
| *H02G 1/08* | (2006.01) | |
| *H01B 7/00* | (2006.01) | |

(52) U.S. Cl.
CPC .................. *F16L 3/06* (2013.01); *H02G 1/08* (2013.01); *H01B 7/0045* (2013.01)

(58) Field of Classification Search
CPC ............ F16L 3/06; H02G 1/08; H01B 7/0045
See application file for complete search history.

(56) References Cited

U.S. PATENT DOCUMENTS

| | | | | |
|---|---|---|---|---|
| 6,238,235 | B1 * | 5/2001 | Shavit ............... | H01R 13/6471 439/418 |
| 9,358,937 | B2 * | 6/2016 | Matsuda ............ | B60R 16/0215 |
| 2005/0189453 | A1 * | 9/2005 | DeGuevara ........... | H02G 3/305 248/68.1 |
| 2010/0132979 | A1 * | 6/2010 | Chen ....................... | H02G 3/32 174/135 |
| 2011/0290951 | A1 * | 12/2011 | Guthke ..................... | H02G 3/32 248/68.1 |
| 2014/0131528 | A1 * | 5/2014 | Blakeley .................. | H02G 3/32 248/74.2 |
| 2018/0015890 | A1 * | 1/2018 | Aigner ................ | B60R 16/0215 |
| 2020/0255695 | A1 * | 8/2020 | Klingeberg ................ | C09J 5/00 |

FOREIGN PATENT DOCUMENTS

| | | | | |
|---|---|---|---|---|
| CN | 204793905 U | * | 11/2015 | |
| CN | 106764079 A | * | 5/2017 | |
| WO | WO-2010117558 A2 | * | 10/2010 | ............. F16L 3/223 |
| WO | WO-2015058245 A1 | * | 4/2015 | ............. F16L 3/227 |

* cited by examiner

*Primary Examiner* — Terrell L McKinnon
*Assistant Examiner* — Ding Y Tan

(57) ABSTRACT

A wire holder device is disclosed. The wire holder device may have four main faces and one wire channel running across the main face. Wire holder members may have four wire channel sections, which may have different volumes, that may be a slot for holding a wire. Between the wire holder members may be an unframed base section, which may provide a platform for a wire tie.

2 Claims, 15 Drawing Sheets

WIRE HOLDER DEVICE

CROSS-REFERENCE TO RELATED APPLICATIONS

The present application incorporates by reference and claims the benefit of the nonprovisional application and the provisional application that are identified in the Application Data Sheet.

BACKGROUND OF THE INVENTION

1. The Field of the Invention

The present invention relates generally to temporarily securing wires in one or more positions so that a human or robot may perform work on the wires.

2. Background

Traditionally, a worker who wanted to work with a bundle of wires often faced difficulties. Accurately and rapidly assembling bundles of wires was often made difficult by existing devices. On one hand, a worker could assemble wires in groups and then tie a wire tie around the wires; however, workers often found that the wires would either bunch up or not stay in a tidy bundle. Additionally, some workers struggled to keep the wires in a bundle with their hands while also using their hands to tie the wire bundles.

Relevant industries include, but are not limited to aftermarket automotive, boating, model airplane, model train, amateur radio, home-built aircraft, hobbyist, robotic, etc. Any industry which creates wire harnesses or wire bundles may also be relevant.

BRIEF DESCRIPTION OF THE DRAWINGS

The preferred embodiments of the present invention will be described in conjunction with the appended drawings. Like designations denote like elements, and.

In some embodiments the wire holder device is a single block extruded from a single mold. The wire holder device may have substantially four faces, and each face may have a channel for wires. In the preferred embodiments, the channel may be generally U shaped, or arc shaped, but may also be V shaped, trapezoidal shaped, or "\_/" shaped. In the preferred embodiments each of the channels for wires may be different sizes to accommodate different sizes of wire.

DETAILED DESCRIPTION

It will be readily understood that the components of the present invention, as generally described with reference to the drawings herein, could be implemented in a wide variety of different configurations. Thus, the following more detailed description of the embodiments of the system and method of the present invention, is not intended to limit the scope of the invention but is merely representative of various embodiments of the invention. Unless explicitly stated, the use of "or" means and/or, that is, this the non-exclusive meaning of or.

Figure 1:
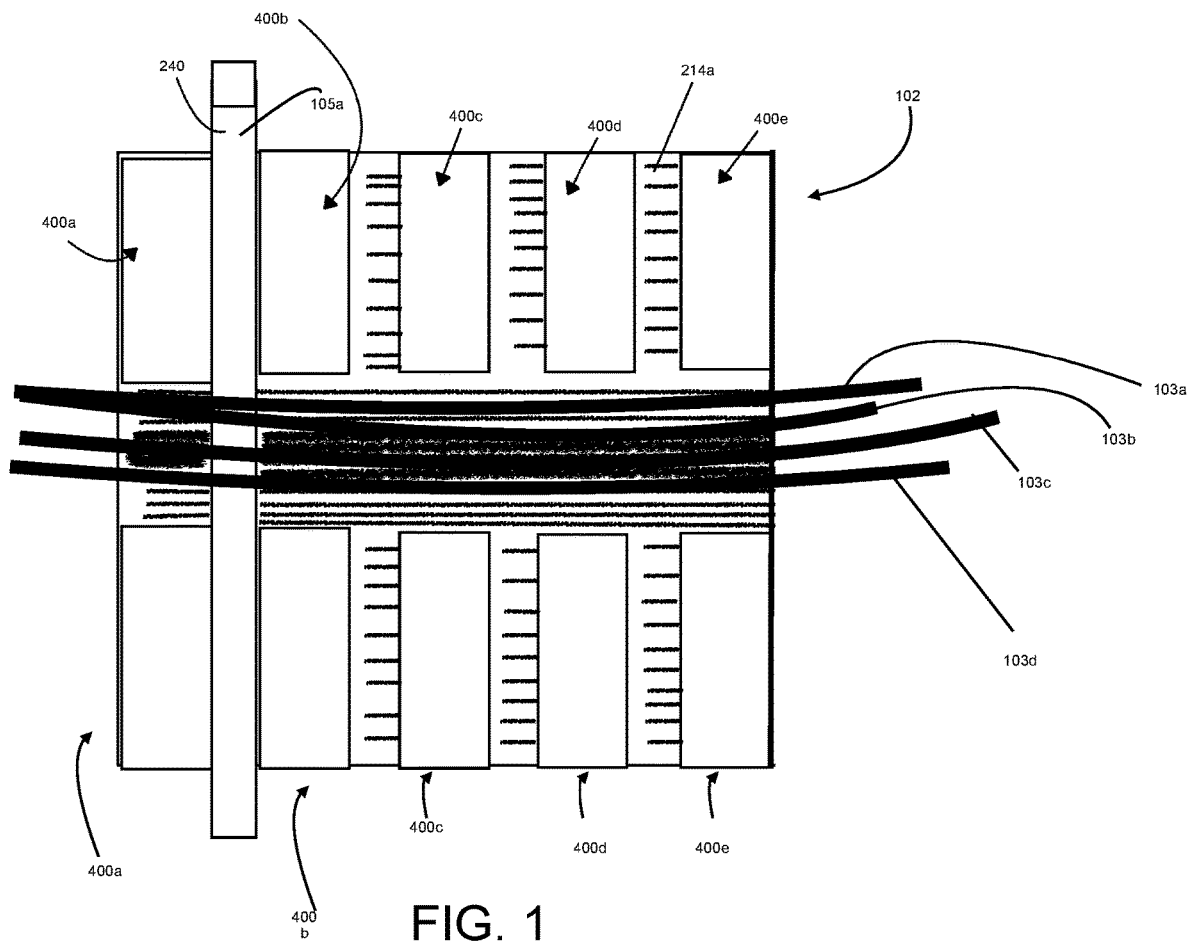
FIG. 1 is a top view schematic of a wire holder device.

A wire holder device (102) may be useful for accurately and cleanly installing wire ties around an assembled bundle of wires. In FIG. 1, a plurality of wires (103a, 103b, 103c, 103d), which may be a plurality of cables, is depicted. A wire tie (105), such as a cable tie, is shown. A wire tie may have a section that is flexible and may have a flexible section with teeth that may engage with a pawl in the head to form a ratchet so that as the free end of the tape section is pulled, the cable tie tightens and does not come undone. See Wikipedia. Some ties include a tab that can be depressed to release the ratchet so that the tie can be loosened or removed, and possibly reused. See Wikipedia.

Figure 4:
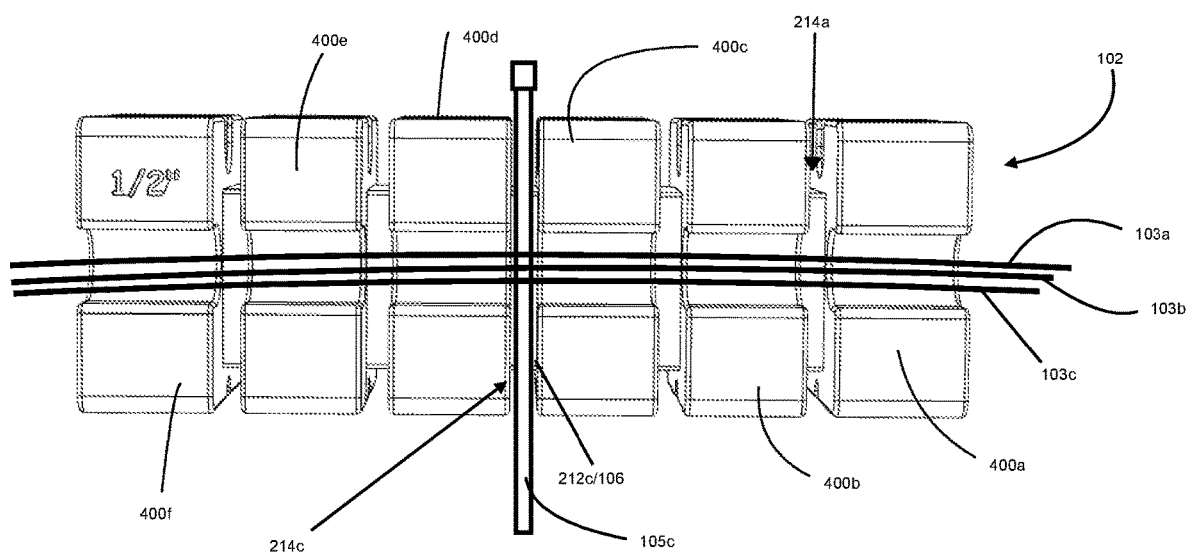
FIG. 4 is a top view of a wire holder that has been loaded with wires and also a wire tie.

Referring to FIG. 4, an embodiment is shown in which a user has positioned a wire tie (105c) into a tie channel (214*c*), onto a third unframed base section (212*c*) which may also be referred to as tie channel base (106) or bottom wall, of a channel of the wire holder device (102), and then the wires may have then be positioned on top of the wire tie. Alternatively, one or more wires may have been first positioned, and then the wire tie (105*c*) may have been orthogonally inserted below the wires. In the preferred embodiments, the wires or cables may be positioned generally perpendicular to the wire tie. In FIG. 1, only a single wire tie is depicted; however, five or more wire ties may be loaded onto the wire holder device when the wire holder device is in the position as depicted in FIG. 1.

The side of the wire holder device may be marked with a size value, such as ½ inch, which may indicate the diameter or radius of the wire for which the wire channel is designed for.

Figure 2:
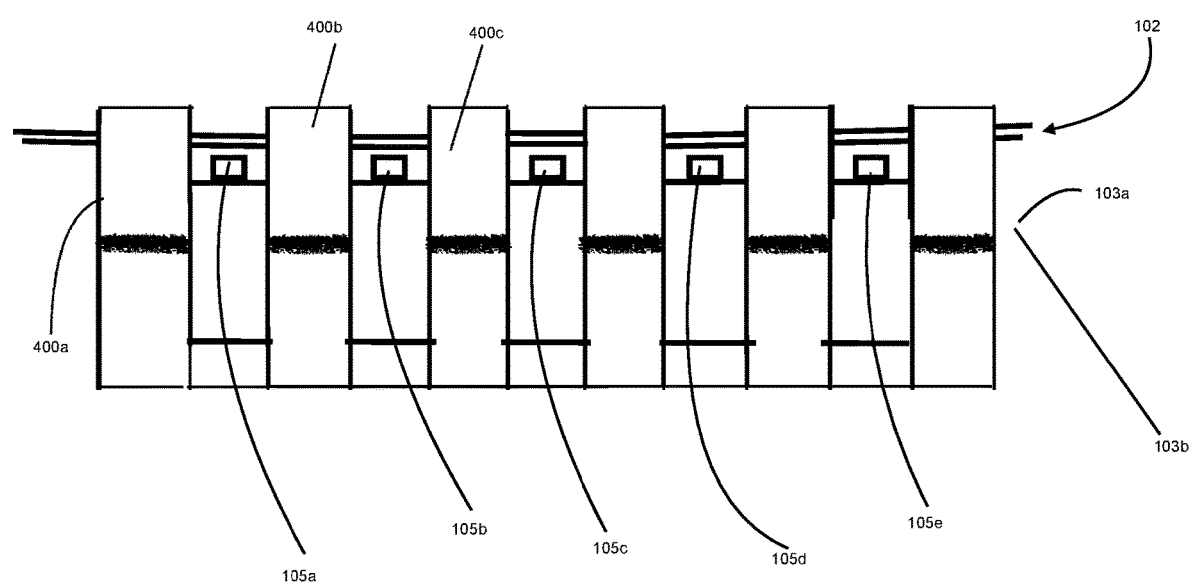
FIG. 2 is a side view schematic of the wire holder device of FIG. 1 in which the length of the wire holder device runs from the left side of the page to the right side of the page.

FIG. 2 depicts a side view schematic of an embodiment of the wire holder device (102). (In FIG. 1 the embodiment of the device is designed for loading between 1, 2, 3 or 4 wire ties onto the device as shown from that angle). In FIG. 2, 5 wire ties have been loaded into the wire holder device; the embodiment shown in FIG. 2 may be a longer version of the embodiment of FIG. 1 having an additional wire tie channel. The wires are depicted as being suspended in a wire channel, also known as a valley, above the wire ties. Other objects may be used in place of the wire ties, such as string, plastic ties, or other materials that may be used for bundling two or more wires or cables. Thus, the use of "wire" may also include cables or other similar objects, and the use of "wire tie" may refer to any object that may be used to secure a bundle of wires.

Figure 3:
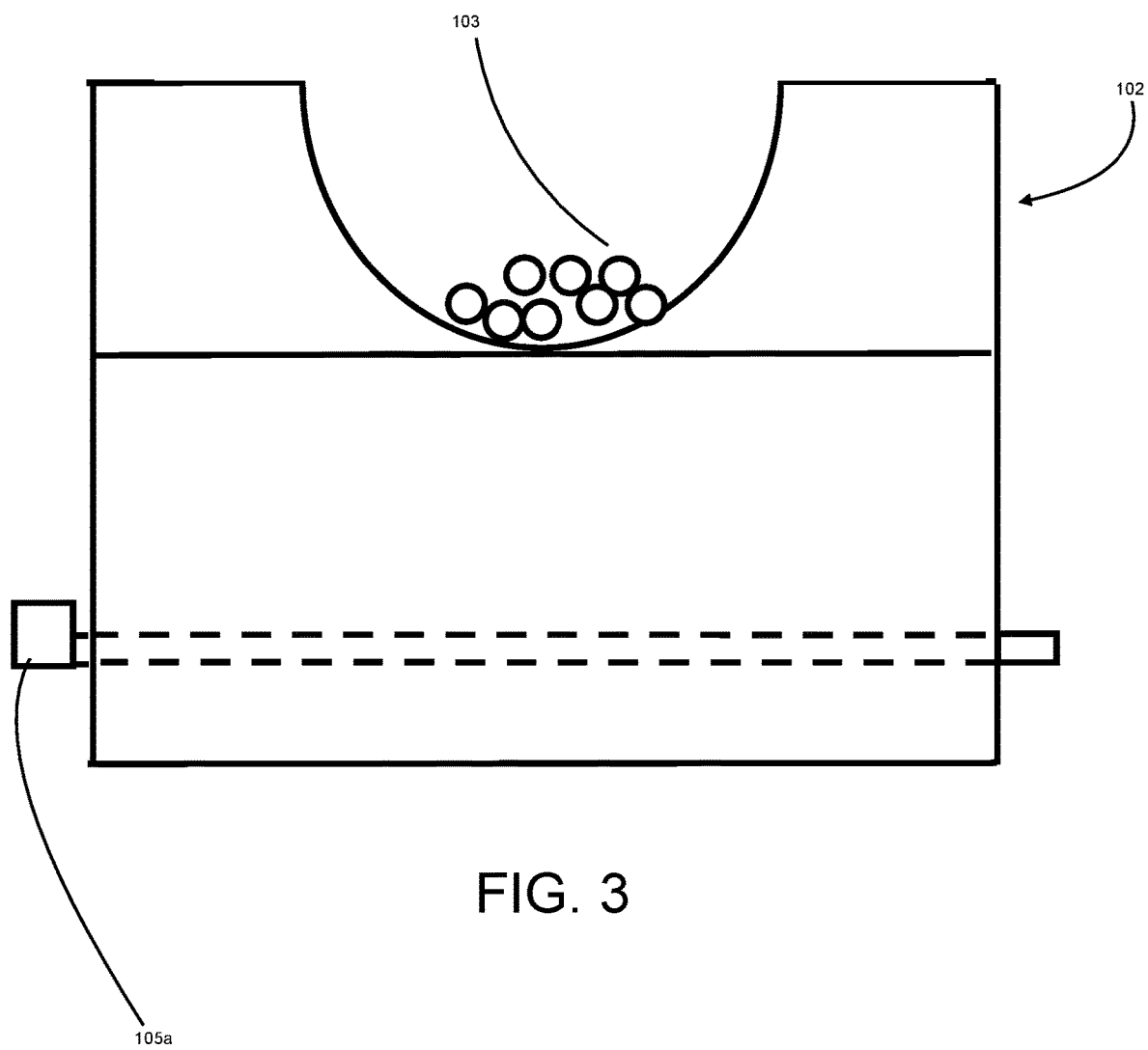
FIG. 3 is an end view schematic of the wire holder device in which the viewer is looking straight on to an end piece of the wire holder device wherein the length of the wire holder device is not generally viewable.

FIG. 3 depicts a side view of an embodiment of a wire holder device (102); in this embodiment, 8 wires are shown in the channel, also known as the valley.

A following embodiment describes a method for using the wire holder device. The method is nonlimiting. A user may lay down wire ties into slots which are termed a tie channel (214*a*). All, some, or none of the tie channels of a wire holder device may be loaded with at least one wire tie. In the preferred embodiments, only one wire tie is positioned, at a time, in a single tie channel. In some embodiments, the wire holder device may be color coded to signify which tie channels should be loaded with a wire tie so as to bundle a group of wires at certain intervals. For example, in some embodiments, a tie channel may have an unframed base section of an elongated base, which may be termed a tie channel base, upon which a wire tie may be rested. In some embodiments, a tie channel base may contain a colored marking such as a blue circle. Other tie channel bases may have a different colored marking; thus, when a user assembles the wire holder device from at least two wire holders, then the user may choose to arrange the wire holders based on the colors of the wire holders so as to create a pattern. For example, a user may first arrange a wire holder having a blue colored tie channel, then a wire holder not having any colored markings on the tie channel, then a wire holder having a blue colored tie channel, and so forth per the described pattern. A user may then place a wire tie on the blue colored tie channels, thereby following a prearranged pattern and interval for the spacing of the wire ties.

In the preferred embodiments, the wire ties are positioned first in the wire tie channels and then the wires or cables are placed substantially perpendicular to the wire ties in a wire channel, which may be termed a valley.

In some embodiments, the wires are first positioned in the wire channel, and then a user may push through a tie through a tie channel underneath the wires.

In the preferred embodiments, a bundle of parallel or substantially parallel wires are placed in the wire channel; preferably extending on both ends past the wire holder device. Any of the wire ties may then be secured around the bundle of wires, and the other tires may also be secured. A user may then remove the bundle of wires from the wire channel; a user may then place the bundle of wires, after having secured at least one wire tie around the bundle of wires. A user may then repeat steps of the method to use the wire holder device to secure additional wire or wires to the bundle of wires.

A wire holder device may be made from metal such as aluminum, plastic, a composite material or other material.

Some embodiments of a wire holder device may have a hollow core, which may also be utilized such that a dowel may be inserted through the hollow core and one or more wire holders may be moved up or down the dowel. The dowel may have grooves or slits or flanges that hold the wire holder in a location along the dowel. The flanges may be movable; or the hollow core of the device may have slits, that are aligned with the main length of the device, that may allow for a flange to be slid up into the slit, and then the flange may be rotated so as to be held within a side portion of the slit so that the flange may not be easily removed from the side portion of the slit until the flange has been rotated so as to be aligned with the portion of the slit that is aligned with the main length of the device.

The wire holder device may have certain dimensions such as a length between 1 inch and 100 inches, with the preferred length being between 4 inches and 8 inches.

The wire holder device in some embodiments is made up of two or more wire holder members that are detachably coupled (see the provisional application), but in some preferred embodiments the wire holder device is a single piece or a single block. The wire holder may be made from a metal such an aluminum, a composite material, a plastic or other material. In some embodiments a wire holder device may be 3 inches tall, six inches long, and 4 inches wide. Any listed dimensions are nonlimiting. In some embodiments a wire holder device may be 1 to 5 inches tall, four to ten inches long, and 2 to 7 inches wide.

The tie channel may have some vertical aligned walls which may be useful for helping keep the wire ties aligned substantially perpendicular.

A wire holder device may have four main sides, or it may have one main side, two main sides, or more than four main sides (main sides referring to a face that may receive one or more wire ties). The wire channel may be of different depths. In the preferred embodiments, the vertical distance from an unframed base section (see 212*a*) to the adjacent bottom portion of a wire channel section may be generally or substantially equal to the other vertical distances from other unframed base sections to other adjacent bottom portions of other wire channel sections of the same face of the device or of the same device. See FIG. 5M for the distance between arrow tips of reference arrows 700-700, 701-701, 702-702, or 703-703 as representative of the vertical distance from an unframed base section (see 212*a*) to the adjacent bottom portion of a wire channel section. In the preferred embodiments the shape of the valley may be arc.

The device, which may have 4 main sides, may allow for different depths of wire channels. In the preferred embodiments, the wire channel sections of the same face or same main side may be generally of the same depth. Once a collection, or bundle, of generally parallel wires is laid in one of the 4 wire channels of some embodiments, the positioning of the wire tie channels may allow a wire tie to be placed at set intervals, such as one inch. In some embodiments, the horizontal distance between each wire tie channel may be used for positioning wire ties at set intervals.

An elongated base (200) may have a thickness between 0.1 mm and 10 mm; In the preferred embodiments, the elongated base (200) may run the length of the device, may be cuboid, or may be cuboid with a hollow core. A framed base section may refer to a portion of the elongated base (200) that is circumscribed by a wire holder member (400a etc.). In the preferred embodiments, a wire holder member (400a) may be three dimensional with two generally squarish faces; when looking straight on at one of the two generally squarish faces, a wire channel section may be disposed at one of four locations: the "North", "South", "West" and "East" positions of a compass. Generally, a wire holder device may have between one and 200 wire holder members; In the preferred embodiments, there are between four and 8 wire holder members; in some preferred embodiments, there are 6 wire holder members. When there are 6 wire holder members, then all of the wire channel sections that are aligned across the same side of the wire holder device collectively form a wire channel. Typically, a wire tire channel will be disposed between two adjacent wire holder members; the bottom portion of a wire tie channel may be an unframed base section (212); thus when a plurality of wires are placed into a wire channel, then the plurality of wires will have a section that rests upon a wire channel section, followed by a section of the plurality of wires that is suspended above a wire tie channel, followed by a section of the plurality of wires that is suspended.

A wire channel section may refer to a portion of the wire holder device that defines a wire channel section space. The wire channel sections, which collectively form a wire channel that may have regular spaced gaps, on a single main face may all be of the same size, volume, or area. There may be four different sizes of wire channels. Gaps, also referred to as wire tie channels, may provide a location for which a wire tie may be positioned or may have been positioned.

An embodiment is disclosed of a wire holder device (102) for securing a plurality of wires with at least one wire tie (105) having a width, the wire holder device may have an elongated base (200), the elongated base may have a plurality of framed base sections (210a, 210b) and a plurality of unframed base sections (212a, 212b); the device may have a plurality of wire holder members (400a etc., herein the use of "etc." refers to other elements in the series such as the second wire holder member 400b and so forth), disposed upon and framing at least one section of the elongated base (200), wherein each of the wire holder members may have a first generally squarish frame (211), the first generally squarish frame (211) may have a first edge (121a etc.), a second edge (121b etc.), a third edge (121c etc.), and a fourth edge (121d etc.); a first wire channel section (131a) may be disposed generally along a midline of the first edge (121a); a second wire channel section (131b) may be disposed generally along a midline of the second edge (121b); a third wire channel section (131c) may be disposed generally along a midline of the third edge (121c); and, a fourth wire channel section (131d) may be disposed generally along a midline of the fourth edge (121d).

Embodiments of the wire holder device (102) may have a length of the elongated base (200) that is between five and seven inches.

Embodiments of the wire holder device (102) of claim 2 may have a length of the elongated base (200) that is substantially six inches.

Figure 5A:
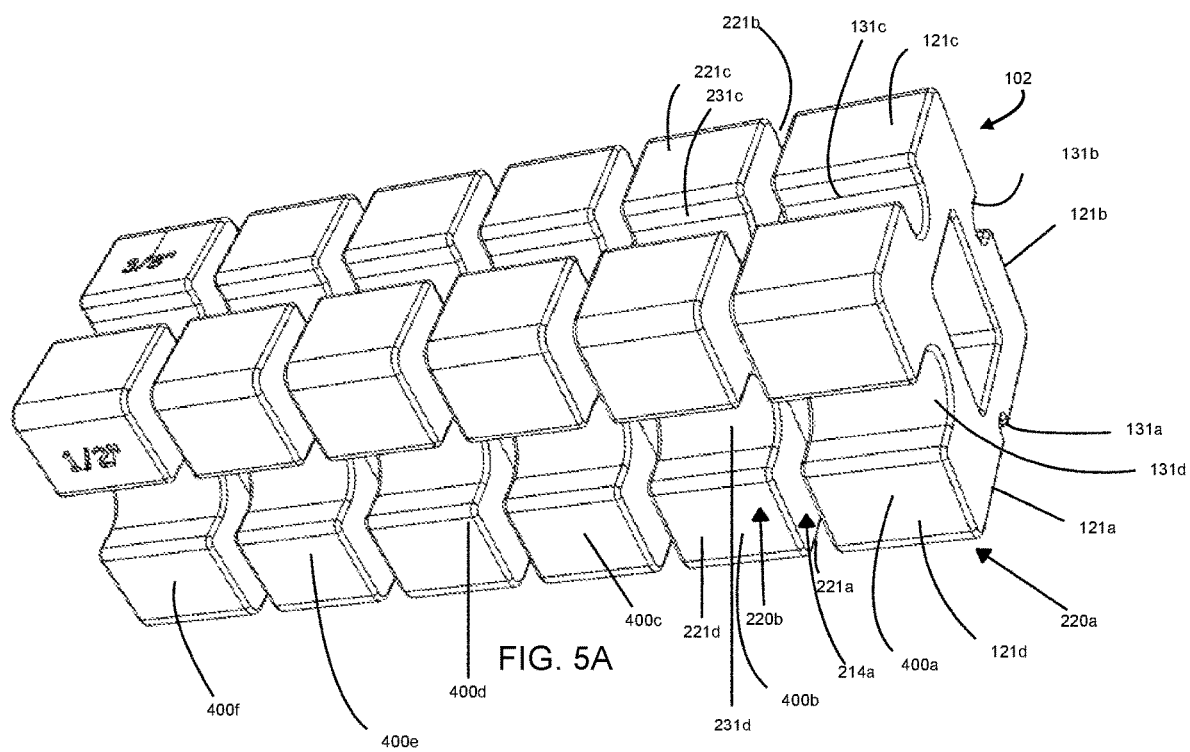
FIG. 5A shows a perspective view of an embodiment of a wire holder device, according the principles described therein.
Figure 5B:
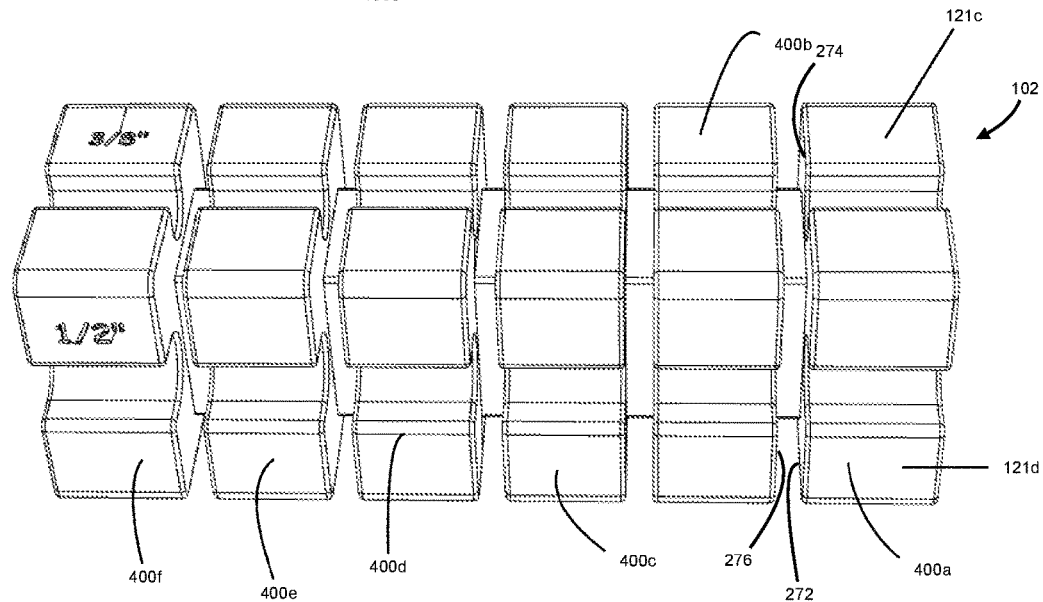
FIG. 5B shows a perspective view from the top of an embodiment of a wire holder device, according the principles described therein.
Figure 5C:
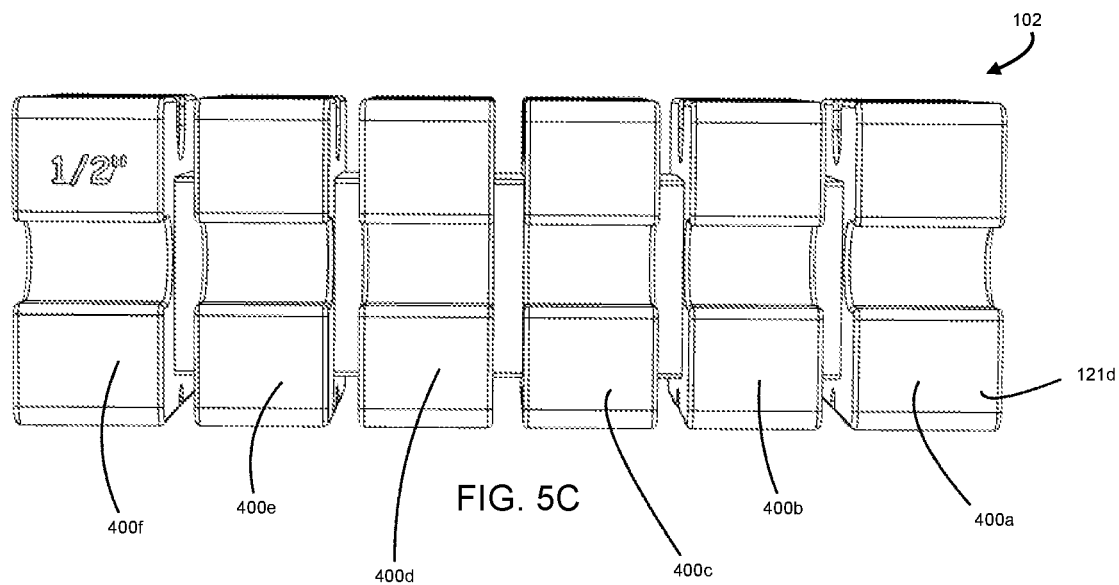
FIG. 5C shows a side view of an embodiment of a wire holder device, according the principles described therein.
Figure 5D:
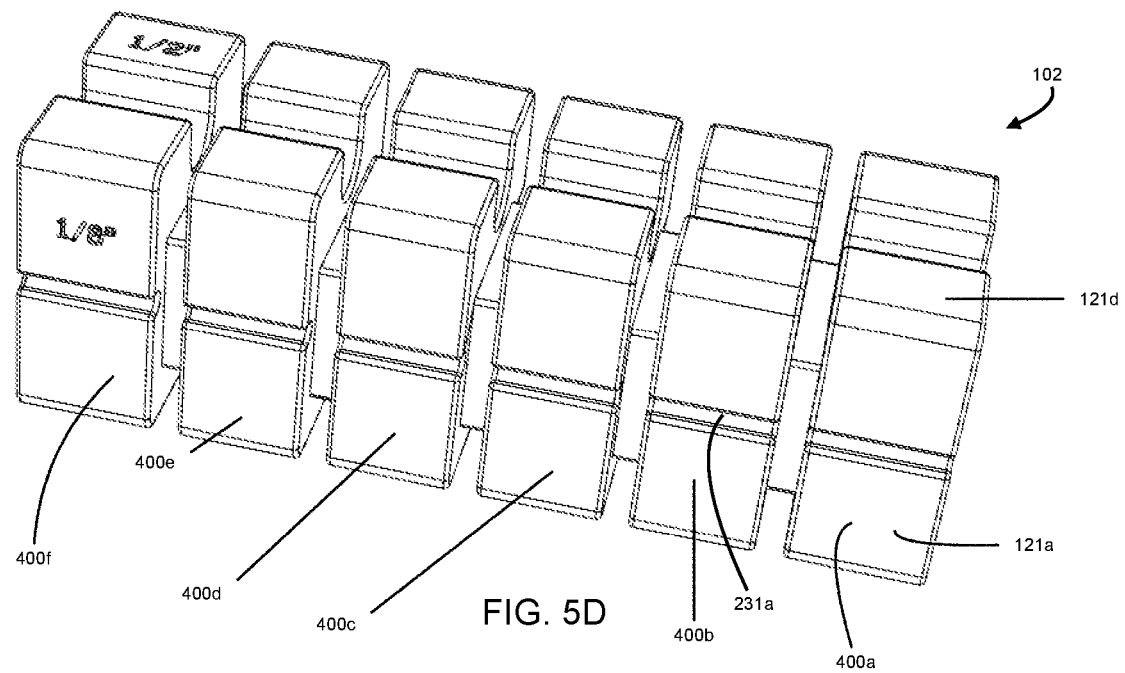
FIG. 5D shows a perspective view, from the bottom view looking upwards, of an embodiment of a wire holder device, according the principles described therein. The optional "½ inch" marking provides a reference point for the degree of rotation of the device.
Figure 5E:
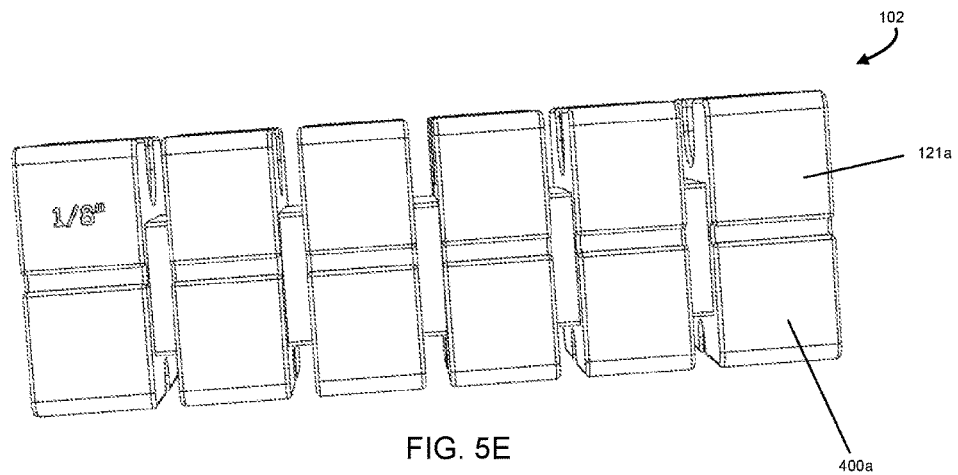
FIG. 5E shows a bottom view, looking generally upward, of an embodiment of a wire holder device, according the principles described therein.
Figure 5F:
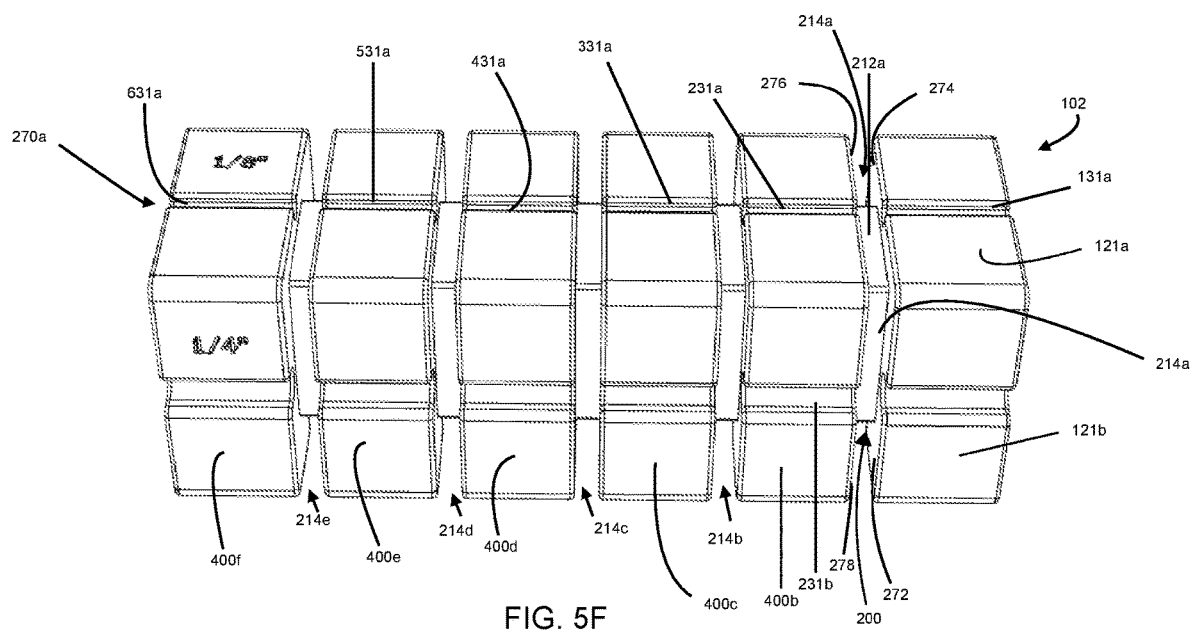
FIG. 5F shows a perspective view, looking primarily at the back side that has an optional engraving of "¼ inch."
Figure 5G:
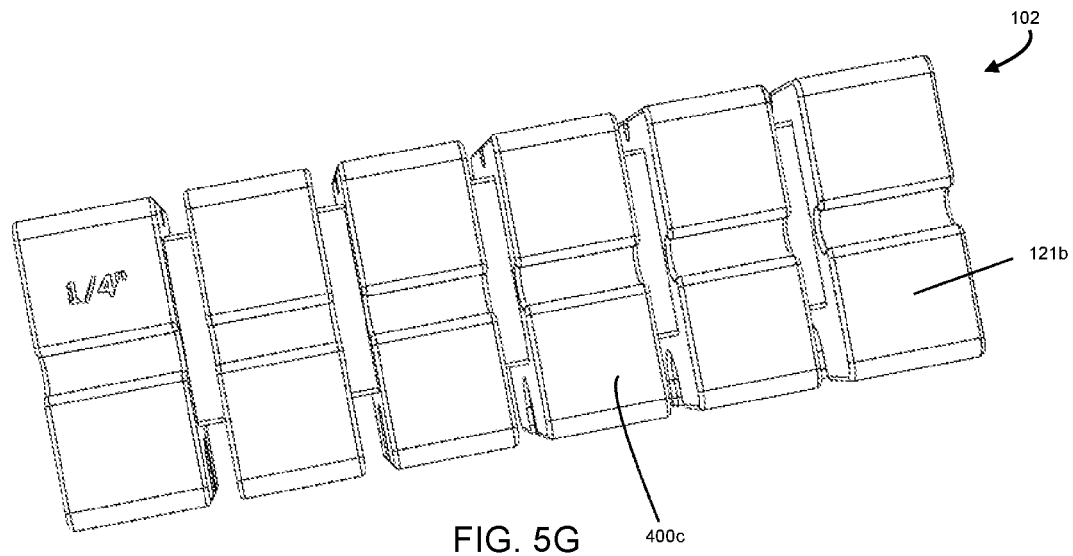
FIG. 5G shows a perspective view, looking at the back side, of an embodiment of a wire holder device, according the principles described therein.
Figure 5H:
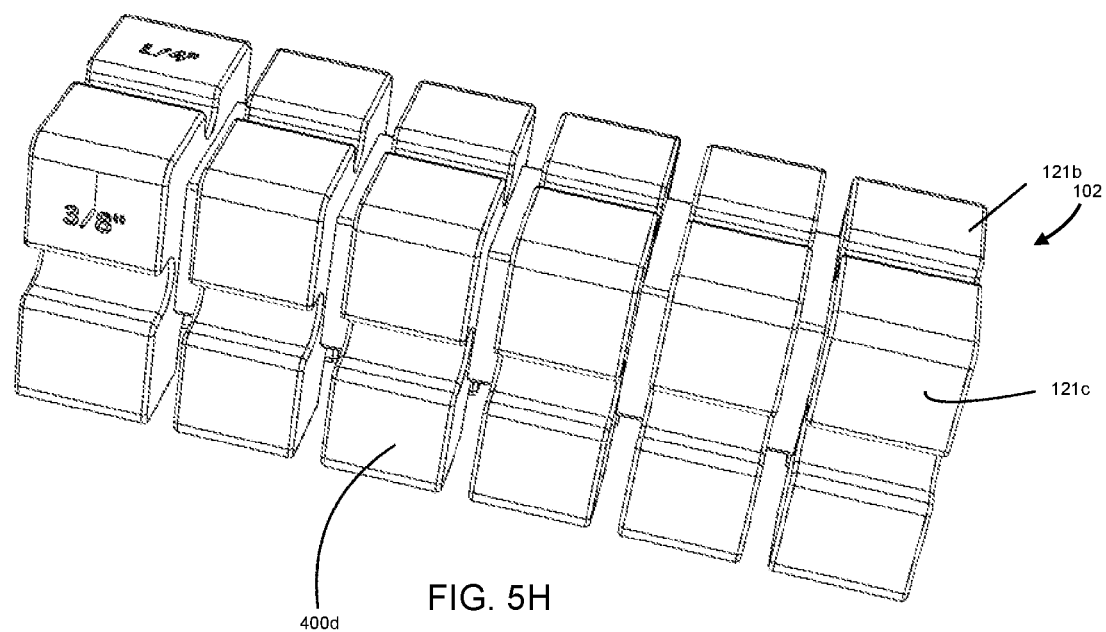
FIG. 5H shows a perspective view of an embodiment of a wire holder device, according the principles described therein; the face with "⅜ inch" is the top face that has been rotated.
Figure 5I:
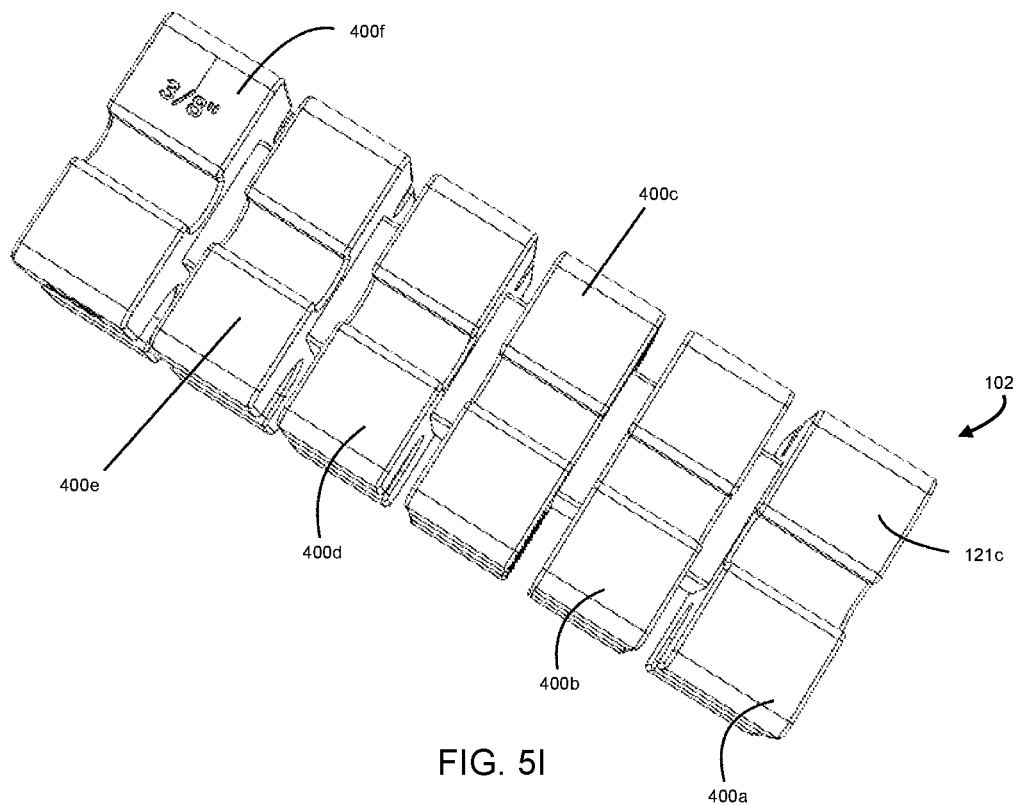
FIG. 5I shows a generally top view, looking downwards, of an embodiment of a wire holder device, according the principles described therein.
Figure 5J:
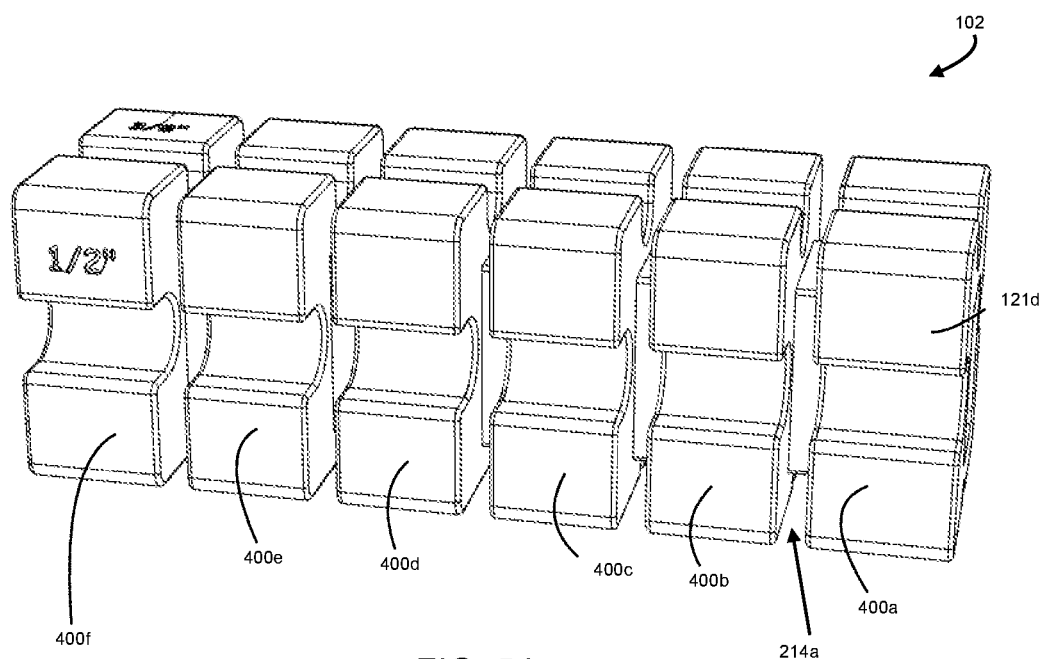
FIG. 5J shows a perspective view of an embodiment of a wire holder device, according the principles described therein.
Figure 5K:
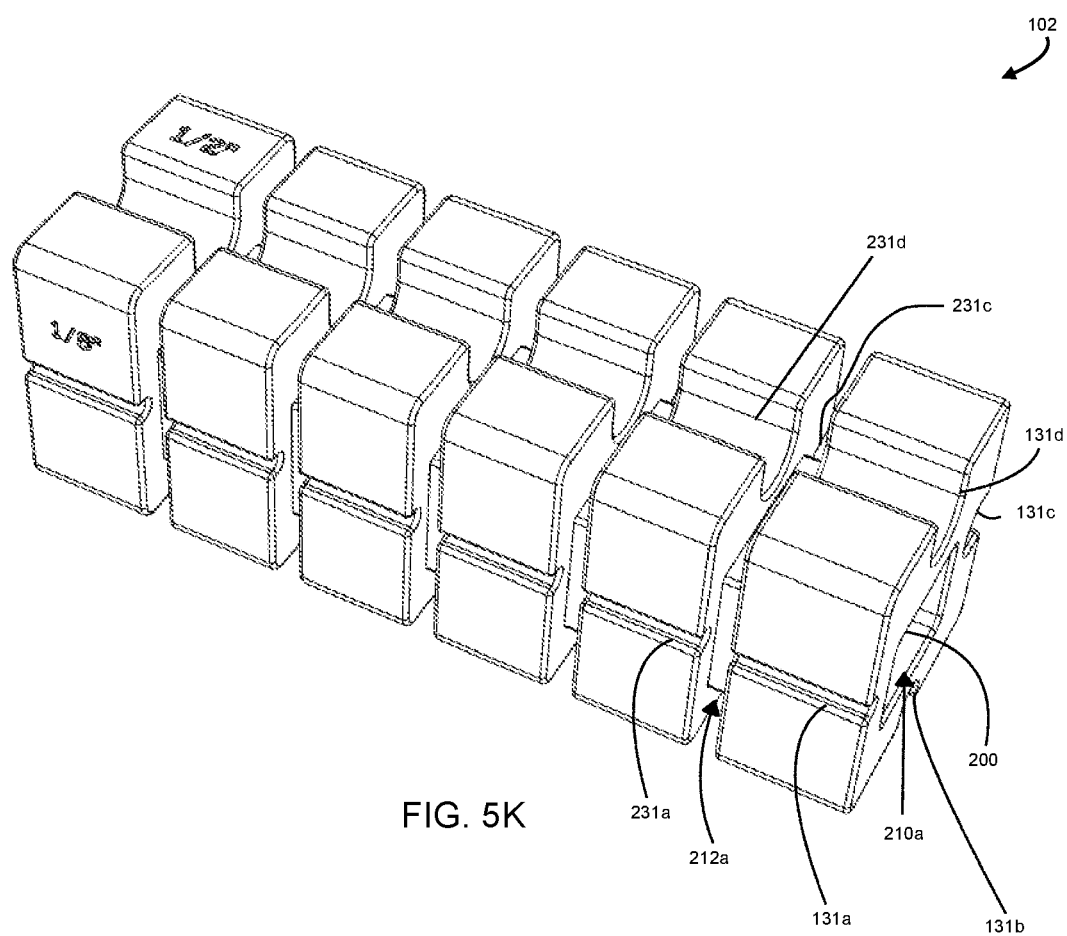
FIG. 5K shows a perspective view of an embodiment of a wire holder device, according the principles described therein.
Figure 5L:
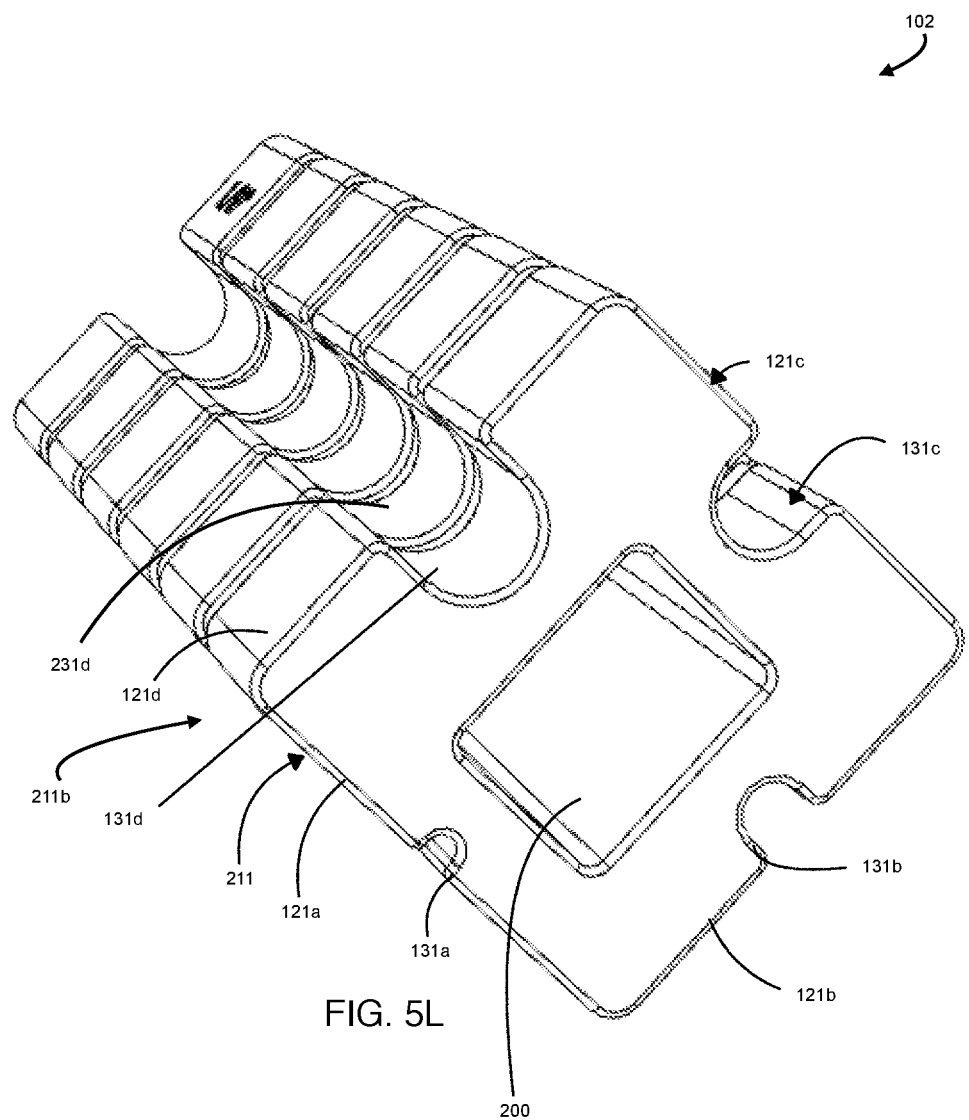
FIG. 5L shows a perspective-side view, looking through a partially downwards into the inner surface, of an embodiment of a wire holder device, according the principles described therein.
Figure 5M:
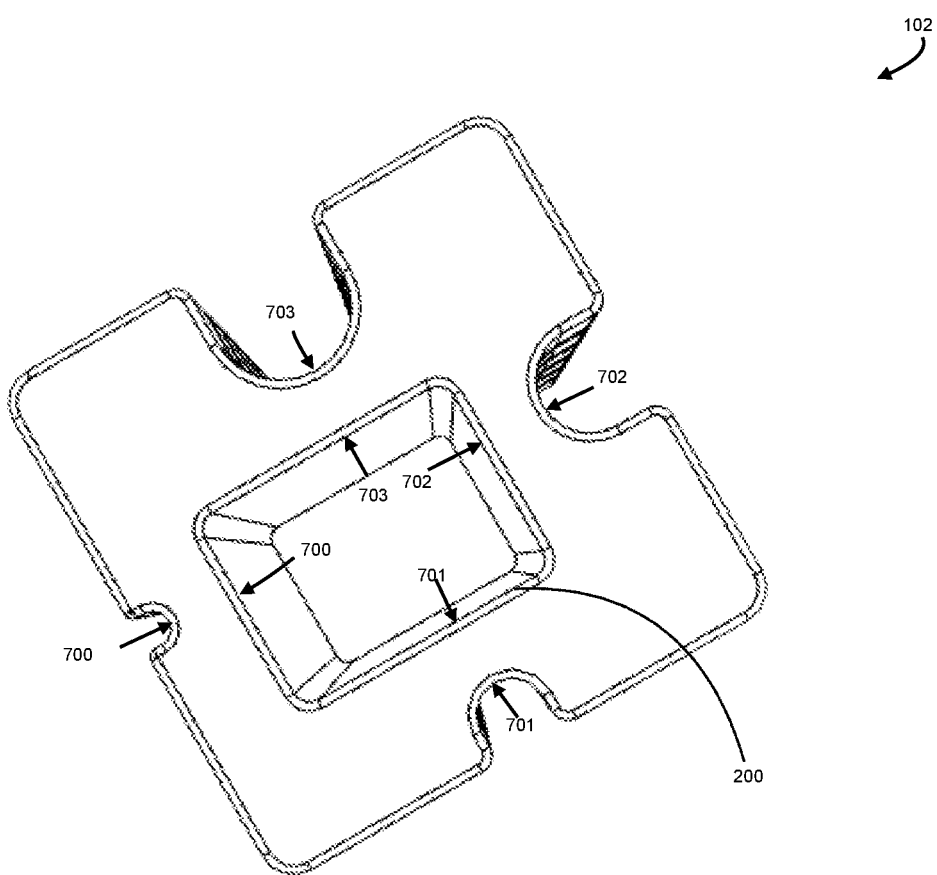
FIG. 5M shows a side view of a hollow embodiment of a wire holder device, looking through the hollow core, according the principles described therein.
Figure 5N:
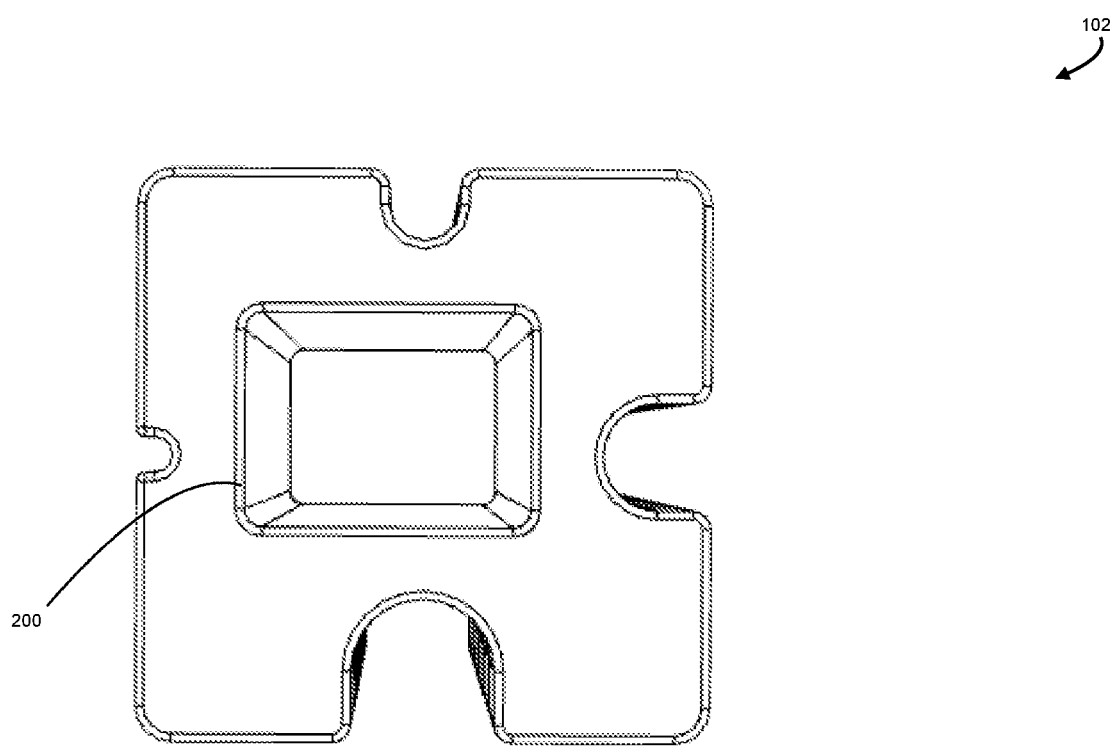
FIG. 5N shows a side view of one end of an embodiment of a wire holder device, according the principles described therein.
Figure 5O:
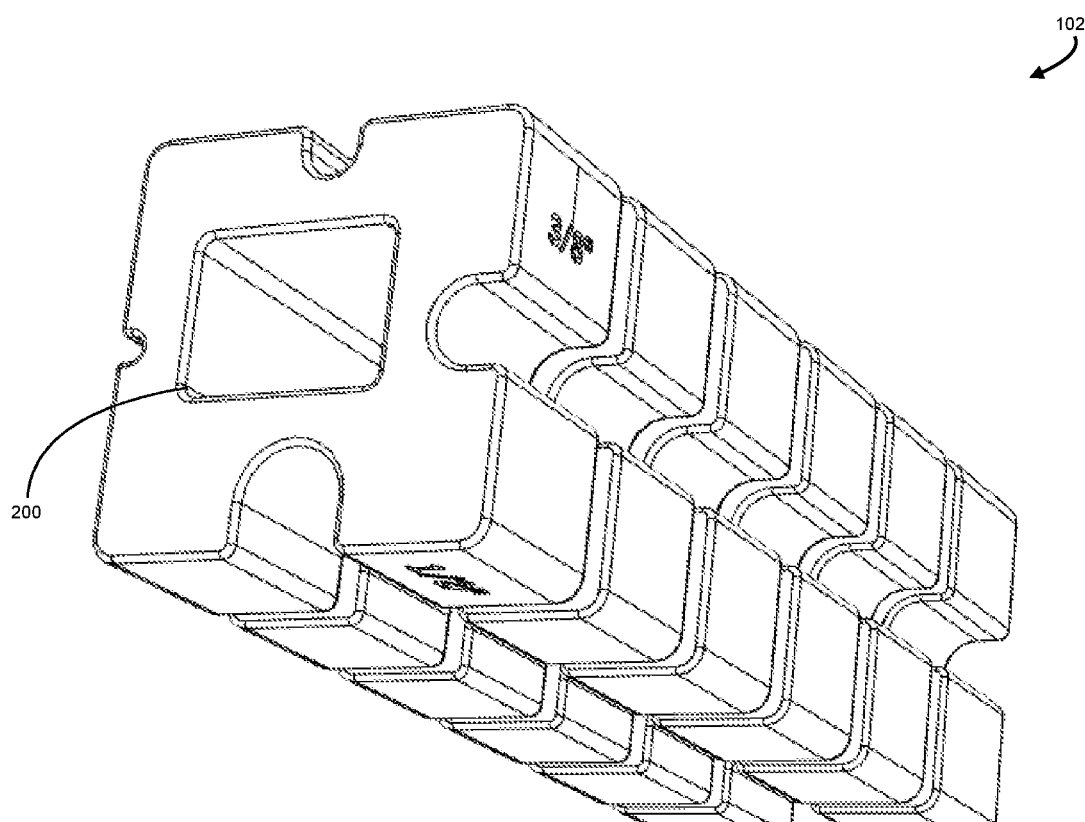
FIG. 5O shows a perspective view of an opposing end of an embodiment of a wire holder device, according the principles described therein; the face with the optional "⅜ inch" engraving provides a reference point.

Referring to FIG. 5K, an embodiment of a wire holder device (102) is disclosed; the embodiment may be for securing a plurality of wires with at least one wire tie having a width, the wire holder device may have an elongated base (200), the elongated base may have a first framed base section (210a), a first unframed base section (212a), and a second framed base section (210b). The embodiment may have a first wire holder member (400a), disposed upon the elongated base (200), and the first wire holder member (400a) may have a first generally squarish frame, the first generally squarish frame may have a first edge (121a), a second edge (121b), a third edge (121c), and a fourth edge (121d); a first wire channel section (131a) may be disposed generally along the midline of the first edge (121a); a second wire channel section (131b) may be disposed generally along the midline of the second edge (121b); a third wire channel section (131c) may be disposed generally along the midline of the third edge (121c); a fourth wire channel section (131d) may be disposed generally along the midline of the fourth edge (121d); the embodiment may include a second wire holder member (400b), disposed upon the elongated base (200) and adjacent to the first wire holder member (400a); the second wire holder member (400b) may have a second generally squarish frame (which may be the first generally squarish frame of the second wire holder member, and the usage of "second" may be useful in distinguishing the generally squarish frame of the first wire holder member), the second generally squarish frame may have a first edge (221a), a second edge (221b), a third edge (221c), and a fourth edge (221d); a horizontal distance between the first wire holder member (400a) and the second wire holder member (400b) may be sized to receive the width of the at least one wire tie; a first wire channel section (231a) may be disposed generally along a midline of the first edge (221a); a second wire channel section (231b) may be disposed generally along a midline of the second edge (221b); a third wire channel section (231c) may be disposed generally along a midline of the third edge (221c); a fourth wire channel section (231d) may be disposed generally along a midline of the fourth edge (221d); the embodiment may also include a wire tie channel (214a) which may include the first unframed base section (212a), a first side wall (272) defined by a first face (274) of the first wire holder member (400a), and a second side wall (276) defined by a first face (278) of the second wire holder member (400b); the wire tie channel (214a) being sized to receive the at least one wire tie; a length of the wire tie channel (214a) being greater than a width of the wire tie channel (214a); the wire tie channel (214a) being substantially perpendicular to the first wire channel section (131a) of the first wire holder member (400a) and to the first wire channel section (231a) of the second wire holder member (400b).

The wire holder device (102) may further have a third wire holder member (400c) having a first wire channel section (331a), and a fourth wire holder member (400d) having a first wire channel section (431a).

The wire holder device (102) of claim 5 may further have a fifth wire holder member (400e) having a first wire channel section (531a) and a sixth wire holder member (400f) having a first wire channel section (631a); wherein each of the first wire channel sections (131a, 231a, 331a, 431a, 531a, 631a) collectively define a first wire channel (270a).

The wire holder device (102) may further have a second wire tie channel (214b) disposed between the second wire holder member (400b) and the third wire holder member (400c); The wire holder device (102) may have a third wire tie channel (214c) disposed between the third wire holder member (400c) and the fourth wire holder member (400d); The wire holder device (102) may have a fourth wire tie channel (214d) disposed between the fourth wire holder member (400d) and the fifth wire holder member (400e); and, the wire holder device (102) may have a fifth wire tie channel (214e) disposed between the fifth wire holder member and the sixth wire holder member.

The wire holder device (102) may also have the first generally squarish frame, which may have at least four shoulders; the at least four shoulders may be generally rounded; and wherein, the second generally squarish frame may have at least four shoulders; the at least four shoulders being generally rounded.

The wire holder device's wire tie channel may have a width and may be sized so that the width of the wire tie channel is less than 200% of a width of a wire tie.

The wire holder device (102) may also be configured so that the first wire channel section (131a) of the first wire holder member (400a) may have a lower volume than the second wire channel section (131b) of the first wire holder member (400a); the second wire channel section (131b), of the first wire holder member (400a) may have a lower volume than the third wire channel section (131c) of the first wire holder member (400a); and, the third wire channel section (131c), of the first wire holder member (400a) may have a lower volume than the fourth wire channel section (131d) of the first wire holder member (400a).

The wire holder device (102) may be configured so that its elongated base (200) may have an elongated base hollow edge (216) defining an elongated hollow space; wherein a first distance from a point on the elongated base hollow edge (216a), located directly below a lowest point of the first wire channel section (131a) of the first wire holder member (400a), to the lowest point of the first wire channel section (131a) of the first wire holder member (400a), may be within 75% to 125% of a value of a second distance, of a value of a third distance, and of a value of a fourth distance, wherein the second distance may run from a point on the elongated base hollow edge (216a), located directly below a lowest point of the second wire channel section (131b) of the first wire holder member (400a), to the lowest point of the second wire channel section (131b) of the first wire holder member (400a); wherein the third distance may run from a point on the elongated base hollow edge (216a), located directly below a lowest point of the third wire channel section (131c) of the first wire holder member (400a), to the lowest point of the third wire channel section (131c) of the first wire holder member (400a); the fourth distance may run from a point on the elongated base hollow edge (216a), located directly below a lowest point of the fourth wire channel section (131d) of the first wire holder member (400a), to the lowest point of the first wire channel section (131d) of the first wire holder member (400a).

The wire holder device (102) may have an elongated base (200) that may have an elongated base hollow edge (216) defining an elongated hollow space; wherein a first distance from a point on the elongated base hollow edge (216a), located directly below a lowest point of the first wire channel section (131a) of the first wire holder member (400a), to the lowest point of the first wire channel section (131a) of the first wire holder member (400a), is within 97% to 103% of a value of a second distance, of a value of a third distance, and of a value of a fourth distance, wherein the second distance may run from a point on the elongated base hollow edge (216a), located directly below a lowest point of the second wire channel section (131b) of the first wire holder member (400a), to the lowest point of the second wire channel section (131b) of the first wire holder member (400a); the third distance may run from a point on the elongated base hollow edge (216a), located directly below a lowest point of the third wire channel section (131c) of the first wire holder member (400a), to the lowest point of the third wire channel section (131c) of the first wire holder member (400a); the fourth distance may run from a point on the elongated base hollow edge (216a), located directly below a lowest point of the fourth wire channel section (131d) of the first wire holder member (400a), to the lowest point of the first wire channel section (131d) of the first wire holder member (400a)

The wire holder device (102) may be configured so that the first wire channel section (131) may have a shape selected from the group consisting of a generally U-shape, a generally V-shape, and a generally trapezoidal shape.

The wire holder device (102) of claim 4 may have a first marking and a second marking; the first marking may correspond to a wire diameter length of a wire; the first marking may correspond to a wire diameter length.

A method of using a wire holder device (102) for securing a plurality of wires with at least one wire tie having a width is disclosed, the method may include: providing a wire holder device, the wire holder may have an elongated base (200) comprising a first framed base section (210a), a first unframed base section (212a), and a second framed base section (210b); a first wire holder member (400a), disposed upon the elongated base (200), which may have a first generally squarish frame (211), the first generally squarish frame (211) may have a first edge (121a), a second edge (121b), a third edge (121c), and a fourth edge (121d); a first wire channel section (131a) may be disposed generally along the midline of the first edge (121a); a second wire channel section (131b) may be disposed generally along the midline of the second edge (121b); a third wire channel section (131c) may be disposed generally along the midline of the third edge (121c); a fourth wire channel section (131d) may be disposed generally along the midline of the fourth edge (121d); a second wire holder member (400b) may be disposed upon the elongated base (200) and adjacent to the first wire holder member (400a), which may include a second generally squarish frame (211b), the second generally squarish frame may have a first edge (221a), a second edge (221b), a third edge (221c), and a fourth edge (221d); the device may have a first horizontal distance between the first wire holder member (400a) and the second wire holder member (400b); the first horizontal distance may be sized to receive the width of the at least one wire tie; a first wire channel section (231a) may be disposed generally along a midline of the first edge (221a); a second wire channel section (231b) may be disposed generally along a midline of the second edge (221b); a third wire channel section (231c) may be disposed generally along a midline of the third edge (221c); a fourth wire channel section (231d) may be disposed generally along a midline of the fourth edge (221d); the device may include a wire tie channel (214a) that may have the first unframed base section (212a), a first side wall may be defined by a first face of the first wire holder member (400a), and a second side wall may be defined by a first face of the second wire holder member (400b); the wire tie channel (214a) may be sized to receive the at least one wire tie; a length of the wire tie channel (214a) may be greater than a width of the wire tie channel (214a); the wire tie channel being substantially perpendicular to the first wire channel section (131a) of the first wire holder member (400a) and to the first wire channel section (131b) of the second wire holder member (400b); an additional step of the method of use may include disposing the at least one wire tie into the wire tie channel (214a) and onto the first unframed base section (212a);

an additional step of the method of use may include disposing a portion of the plurality of wires into the first wire channel section (131a) of the first wire holder member (400a);

an additional step of the method of use may include disposing a portion of the plurality of wires into the first wire channel section (231a) of the second wire holder member (400b);

an additional step of the method of use may include disposing a portion of the plurality of wires into a first wire channel section (131c) of a third wire holder member (400c);

an additional step of the method of use may include disposing a portion of the plurality of wires into the first wire channel section (131d) of a fourth wire holder member (400d);

an additional step of the method of use may include folding one or more wire ties substantially around the plurality of wires, the wire ties may have been placed previously and individually in the wire tie channels of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A wire holder device for securing a plurality of wires with at least one wire tie having a width, the wire holder device comprising
    an elongated base comprising a first framed base section, a first unframed base section, and a second framed base section;
    a first wire holder member, disposed upon the elongated base, comprising
        a first generally squarish frame, the first generally squarish frame comprising
            a first edge,
            a second edge,
            a third edge, and
            a fourth edge;
        a first wire channel section disposed generally along the midline of the first edge;
        a second wire channel section disposed generally along the midline of the second edge;
        a third wire channel section disposed generally along the midline of the third edge;
        a fourth wire channel section disposed generally along the midline of the fourth edge;
    a second wire holder member, disposed upon the elongated base and adjacent to the first wire holder member, comprising
        a second generally squarish frame, the second generally squarish frame comprising
            a first edge,
            a second edge,
            a third edge, and
            a fourth edge;
        a horizontal distance between the first wire holder member and the second wire holder member being sized to receive the width of the at least one wire tie;
        a first wire channel section disposed generally along a midline of the first edge;
        a second wire channel section disposed generally along a midline of the second edge;
        a third wire channel section disposed generally along a midline of the third edge;
        a fourth wire channel section disposed generally along a midline of the fourth edge;
    a wire tie channel comprising the first unframed base section, a first side wall defined by a first face of the first wire holder member, and a second side wall defined by a first face of the second wire holder member; the wire tie channel being sized to receive the at least one wire tie; a length of the wire tie channel being greater than a width of the wire tie channel; the wire tie channel being substantially perpendicular to the first wire channel section of the first wire holder member and to the first wire channel section of the second wire holder member;
    wherein the elongated base comprises an elongated base hollow edge defining an elongated hollow space; wherein a first distance from a point on the elongated base hollow edge, located directly below a lowest point of the first wire channel section of the first wire holder member, to the lowest point of the first wire channel section of the first wire holder member, is within 75% to 125% of a value of a second distance, of a value of a third distance, and of a value of a fourth distance, wherein
    the second distance runs from a point on the elongated base hollow edge, located directly below a lowest point of the second wire channel section of the first wire holder member, to the lowest point of the second wire channel section of the first wire holder member;
    the third distance runs from a point on the elongated base hollow edge, located directly below a lowest point of the third wire channel section of the first wire holder member, to the lowest point of the third wire channel section of the first wire holder member;
    the fourth distance runs from a point on the elongated base hollow edge, located directly below a lowest point of the fourth wire channel section of the first wire holder member, to the lowest point of the first wire channel section of the first wire holder member.

2. A wire holder device for securing a plurality of wires with at least one wire tie having a width, the wire holder device comprising
    an elongated base comprising a first framed base section, a first unframed base section, and a second framed base section;
    a first wire holder member, disposed upon the elongated base, comprising
        a first generally squarish frame, the first generally squarish frame comprising
            a first edge,
            a second edge,
            a third edge, and
            a fourth edge;
        a first wire channel section disposed generally along the midline of the first edge;
        a second wire channel section disposed generally along the midline of the second edge;

a third wire channel section disposed generally along the midline of the third edge;
a fourth wire channel section disposed generally along the midline of the fourth edge;
a second wire holder member, disposed upon the elongated base and adjacent to the first wire holder member, comprising
a second generally squarish frame, the second generally squarish frame comprising
a first edge,
a second edge,
a third edge, and
a fourth edge;
a horizontal distance between the first wire holder member and the second wire holder member being sized to receive the width of the at least one wire tie;
a first wire channel section disposed generally along a midline of the first edge;
a second wire channel section disposed generally along a midline of the second edge;
a third wire channel section disposed generally along a midline of the third edge;
a fourth wire channel section disposed generally along a midline of the fourth edge;
a wire tie channel comprising the first unframed base section, a first side wall defined by a first face of the first wire holder member, and a second side wall defined by a first face of the second wire holder member; the wire tie channel being sized to receive the at least one wire tie; a length of the wire tie channel being greater than a width of the wire tie channel; the wire tie channel being substantially perpendicular to the first wire channel section of the first wire holder member and to the first wire channel section of the second wire holder member;
wherein the elongated base comprises an elongated base hollow edge defining an elongated hollow space; wherein a first distance from a point on the elongated base hollow edge, located directly below a lowest point of the first wire channel section of the first wire holder member, to the lowest point of the first wire channel section of the first wire holder member, is within 97% to 103% of a value of a second distance, of a value of a third distance, and of a value of a fourth distance, wherein
the second distance runs from a point on the elongated base hollow edge, located directly below a lowest point of the second wire channel section of the first wire holder member, to the lowest point of the second wire channel section of the first wire holder member;
the third distance runs from a point on the elongated base hollow edge, located directly below a lowest point of the third wire channel section of the first wire holder member, to the lowest point of the third wire channel section of the first wire holder member;
the fourth distance runs from a point on the elongated base hollow edge, located directly below a lowest point of the fourth wire channel section of the first wire holder member, to the lowest point of the first wire channel section of the first wire holder member.

* * * * *